United States Patent [19]

Miller

[11] 4,052,073

[45] Oct. 4, 1977

[54] BLACKJACK PLAY DIRECTOR

[76] Inventor: Franklin E. Miller, 6936 Rockview Lane, Dallas, Tex. 75214

[21] Appl. No.: 629,591

[22] Filed: Nov. 6, 1975

[51] Int. Cl.[2] .............................................. G09B 19/22

[52] U.S. Cl. .................................. 273/148 R; 35/8 B; 235/92 GA; 273/DIG. 27

[58] Field of Search ............... 273/1 E, 138 A, 148 R, 273/DIG. 27; 340/323; 235/92 GA; 35/8 B

[56] References Cited

U.S. PATENT DOCUMENTS

| | | | |
|---|---|---|---|
| 3,082,000 | 3/1963 | Holcombe | 273/DIG. 27 UX |
| 3,463,885 | 8/1969 | Upton | 178/6 X |
| 3,569,683 | 3/1971 | Pugh | 235/152 |
| 3,735,982 | 5/1973 | Gerfin | 273/1 E |
| 3,781,009 | 12/1973 | Gagnon | 273/DIG. 27 X |
| 3,796,433 | 3/1974 | Fraley et al. | 273/138 A |
| 3,962,800 | 6/1976 | Feldheim | 273/148 R X |

*Primary Examiner*—Anton O. Oechsle
*Attorney, Agent, or Firm*—Richards, Harris & Medlock

[57] ABSTRACT

A blackjack play director having structure including normally deenergized indicator means adapted to be sensed by a player. A plurality of input switches are interconnected with indictor means for exclusive generation of one of four sensible play decisions in terms of a predetermined odds criteria to signal to the player a proper response by actuation of the indicator means in response to actuation of a first of the switches representative of the value of a dealer's up card and one or more of the switches to indicate the status of the player's first two cards.

9 Claims, 6 Drawing Figures

BLACKJACK PLAY DIRECTOR

This invention relates to an electrical system which may be packaged for hand held use and which will signal to a blackjack player confronting a dealer the preceise mathematically correct play in response to every possible two card combination the player may hold against the dealer's exposed card.

A blackjack player, after having received two cards face down, is ordinarily required to decide instantly which one of four options he will act upon when it is his turn to play out his hand with the dealer.

The four options are:

1. whether or not, if the player is dealt a pair, to split the pair and play each card as a separate hand;
2. to HIT or STAND on a soft count, i.e., when one of the player's two cards is an ace;
3. whether or not to DOUBLE DOWN before hitting; and
4. whether or not to just STAND or HIT, provided none of the other three options apply.

Numerous sets of rules are published to guide responses of blackjack players. House odds ordinarily are to a degree dependent upon the superior familiarity and experience of the dealer over the player in assessing the probabilities involved in the play at any given time. Heretofore, systems have been devised to provide guidance for play. U.S. Pat. Nos. 3,810,627 to Levy, 3,735,982 to Gerfin, and 3,796,433 to Fraley disclose devices involved in assisting a player to increase his odds in a given game or situation within a game. U.S. Pat. 3,569,683 to Pugh discloses a device which performs a calculating function for cutting lengths of processed material which is based on a probability function and has, therefore, been considered in connection with the present application.

The present invention provides a system which may be hand held and battery operated having four normally deenergized indicators positioned to be simultaneously viewed by a player. It is provided with a plurality of input switches with circuit means for interconnecting the switches and the indicators for exclusive energization of one of the indicators in response to actuation of (i) a first of the switches representative of a value of a dealer's up card, and (ii) one or more of the switches to indicate the status of the player's first two cards in terms of a predetermined odds criteria to signal to the player a proper response by energization of one of the indicators.

In a more specific aspect in accordance with one embodiment a first set of keys is provided, one key to represent each of the cards having a numerical count A, 2 . . . 9, X for entry of the dealer's up card. A second set of keys includes one key to represent each of the cards having numerical count A, 2 . . . 9, X to enter the existence of and the count of a pair in the player's hand. A third set of keys includes one key to represent each of the cards having numerical A, 2 . . . 9, X to enter the value of a card in the player's hand which accompanies an ace. The fourth set includes (a) one key to represent a player's hand total count of eight or less, (b) four keys to represent total counts of 9, 10, 11 and 12, respectively, (c) one key to represent a total count of 13, 14, 15 or 16, and (d) one key to represent a total count of 17 or more.

In such system, interconnections are provided between the switches to provide a circuit excluisvely to one of the indicators to the first set of keys at a location representing the value of the up card and to one of the second, third or fourth sets representing the condition of the player's hand, the interconnections being in accordance with a predetermined odds criteria to signal to the player a proper response. The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
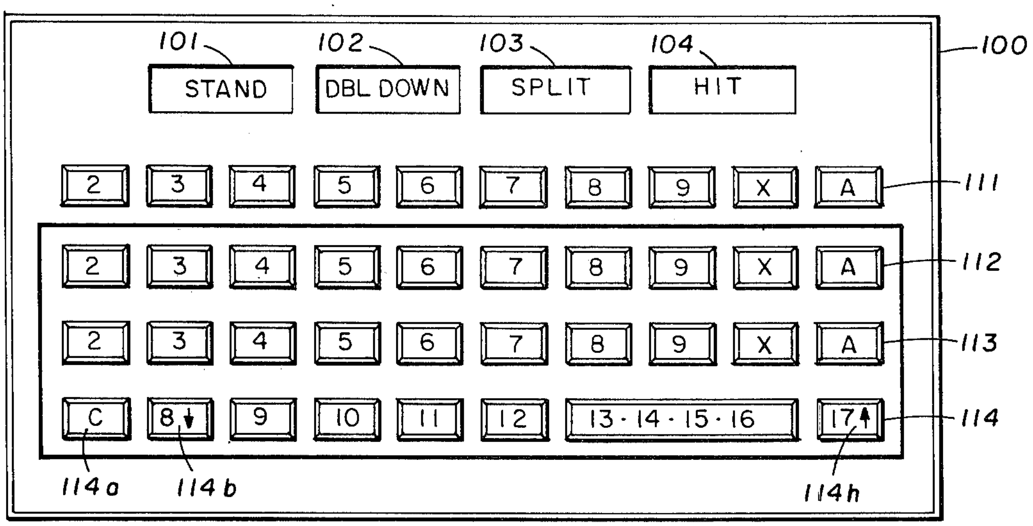
FIG. 1 illustrates the face of an embodiment of the invention suitable for battery energization and hand held operation.
Figure 6:
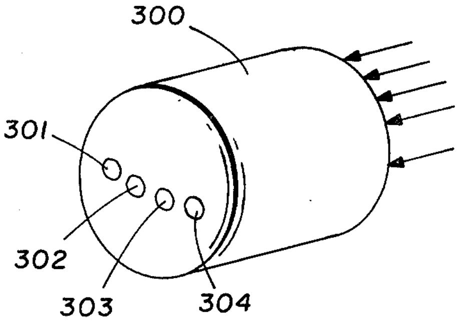
Figure 5:
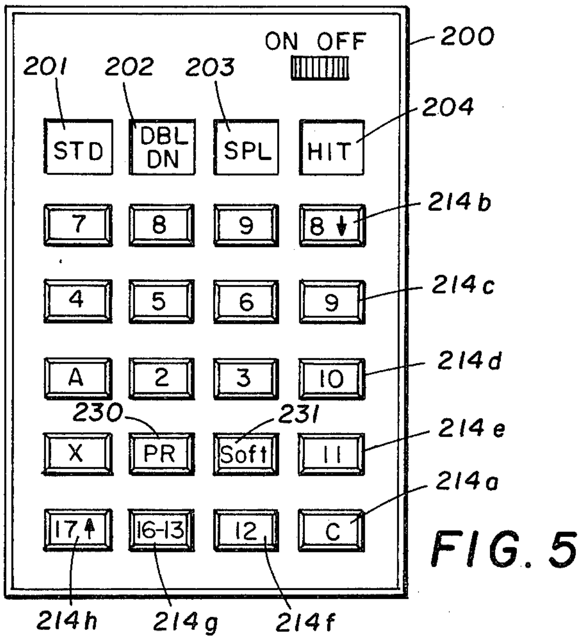
Figure 4:
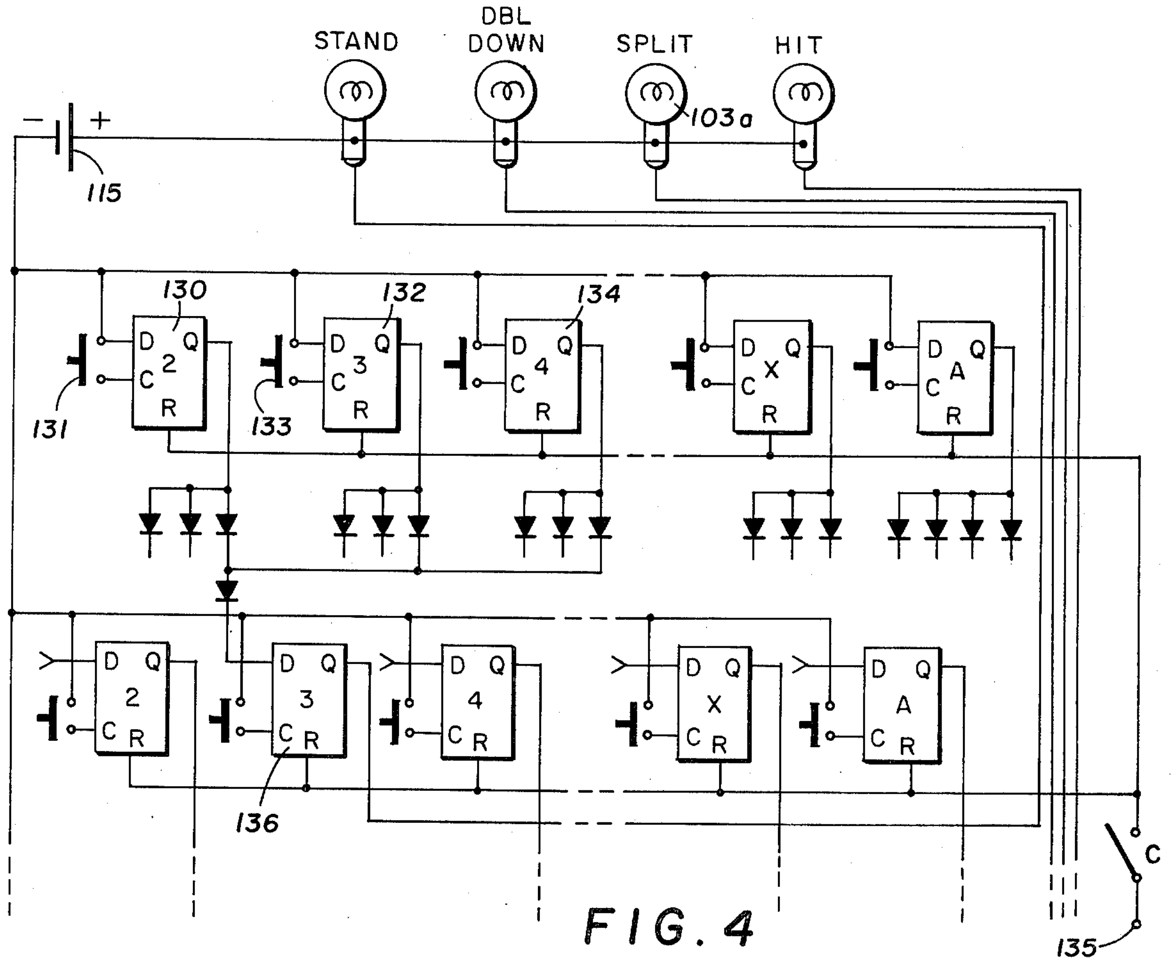

FIG 4. illustrates a system in which a solid state switch circuit is employed;

FIG. 5 illustrates a hand held unit having a different format than that of FIG. 1; and FIG. 6 illustrates a modified form of display. Referring now to FIG. 1, an embodiment of the invention has been illustrated in the form of a relatively small hand held battery operated play director 100. The play director 100 has a top row of four indicators 101–104 which signal the play decision STAND, DOUBLE DOWN, SPLIT, and HIT, respectively. The indicators may comprise electroacoustical or electromechanical transducers. Further, electrical lamps behind windows in the top panel of the play director 100 may be covered by translucent material of different colors on which the insignia STAND, DOUBLE DOWN, SPLIT and HIT are inscribed. Indicators 101–104 normally are deenergized.

Play director 100 also includes four sets of keys 111, 112, 113 and 114. The sets 111–113 each contain a plurality of numerical keys 2, 3 . . . 9, X, A. By this means cards having numerical values 2 through 9, 10 and A (1 or 11) can be represented in the play director 100 by depressing the appropriate key. Cards having value 10 (10, jack, queen and king) can be entered by depressing key X.

Set 114 differs from the others. It includes a first key to signify a total count in a player's hand of eight or less and four keys to signal the total count in a player's hand of 9, 10, 11 and 12. A single key is also provided to signify a total count of 13, 14, 15, or 16. Finally, a single key is provided to signal a total count of 17 or more. A CLEAR key **114*a*** is also provided.

In utilization of the system, the set 111 is utilized to enter a signal into the system representative of the value of the dealer's up card. Sets 112, 113 and 114 are then utilized to signify the status of the player's two card hand in accordance with a predetermined odds criteria. More particularly, set 112 is used exclusively if the player has a pair. Set 113 is used exclusively if the player has a soft count, i.e., an ace and a non ace card. Set 114 is used exclusively if the player's two cards provide a hard count, i.e., neither a pair nor ace present. If the hard count total of the player's two cards is 8 or less, the player actuates key **114*b*. If the two cards in the player's hard count hand total 17 or more, the player actuates key 114*h*.** Similarly, in the range between 8 and 17, the keys are provided for entry of the hard count total.

Switches in director 100 are interconnected in accordance with a predetermined odds criteria. For the purpose of the present invention, a preferred odds criteria is set forth in Table I.

actuated, then lamp **101*a*** is energized signaling the decision to stand.

Figure 3:
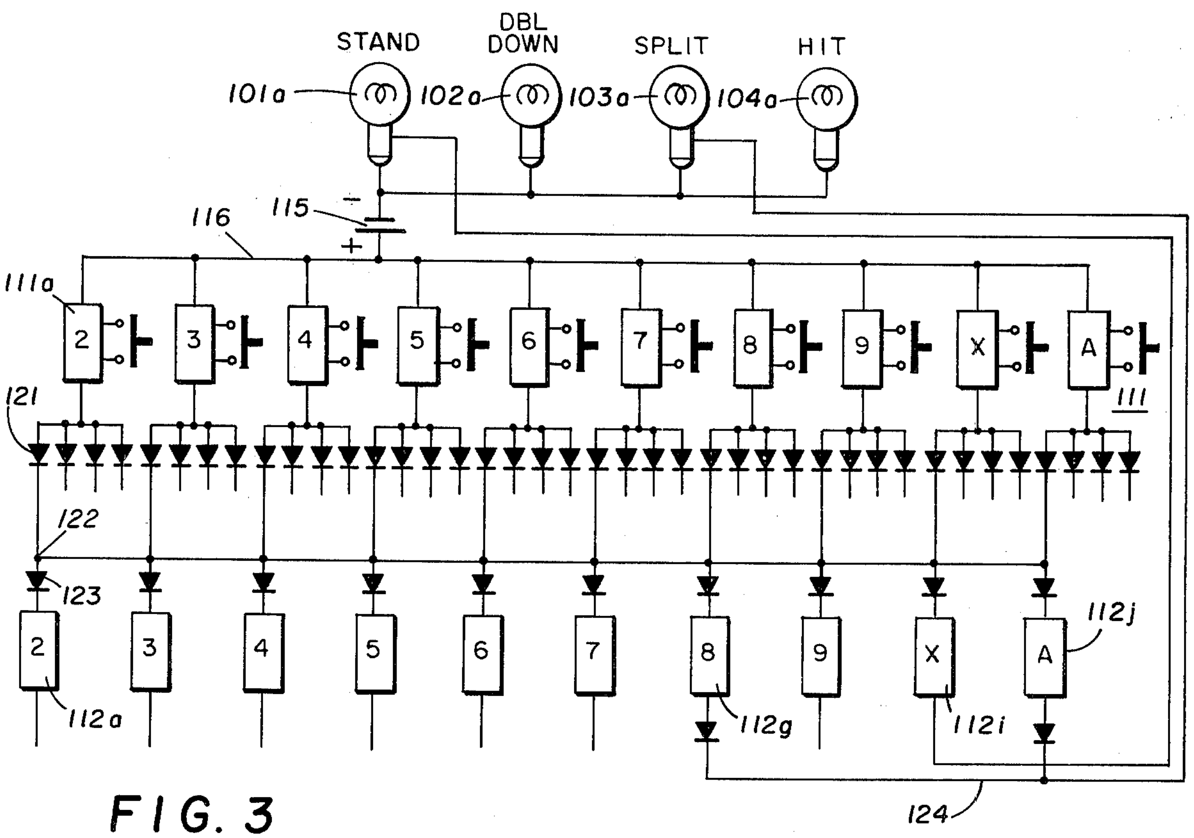
FIG. 3 illustrates the circuit of FIG. 2 in further detail.

In the manner generally illustrated in FIG. 3, every condition set forth in Table I is wired into director 100.

| Dealer Up Card | Player Cards | Decision |
|---|---|---|
| [2+3+4+5+6+7+8+9+10+A] | . [10] pair | Stand |
| [2+3+4+5+6+7+8+9+10+A] | . [8+A] pair | Split |
| [2+3+4+5+6+7] | . [2+3] pair | Split |
| [8+9+10+A] | . [2 +3] pair | Hit |
| [2+3+4+6+7+8+9+10+A] | . [4] pair | Hit |
| [5] | . [4] pair | Split |
| [2+3+4+5+6+7+8+9] | . [5] pair | Double Dn |
| [10+A] | . [5] pair | Hit |
| [8+9+10+A] | . [6] pair | Hit |
| [2+3+4+5+6+7] | . [6] pair | Split |
| [2+3+4+5+6+7+8] | . [7] pair | Split |
| [9+10+A] | . [7] pair | Hit |
| [2+3+4+5+6+8+9] | . [9] pair | Split |
| [7+10+A] | . [9] pair | Stand |
| [4+5+6] | . [2+3+4+5] . A | Double Dn |
| [2+3+7+8+9+10+A] | . [2+3+4+5] . A | Hit |
| [2+3+4+5+6] | . [6] . A | Double Dn |
| [7+8+9+10+A] | . [6] . A | Hit |
| [2+7+8+A] | . [7] . A | Stand |
| [3+4+5+6] | . [7] . A | Double Dn |
| [9+10] | . [7] . A | Hit |
| [2+3+4+5+6+7+8+9+10+A] | . [8+9+10] . A | Stand |
| [2+3+4+5+6+7+8+9+10+A] | . [17 or more] Count | Stand |
| [2+3+4+5+6+7+8+9+10+A] | . [11] Count | Double Dn |
| [2+3+4+5+6+7+8+9+10+A] | . [8 or less] Count | Hit |
| [2+3+4+5+6] | . [13+14+15+16] Count | Stand |
| [7+8+9+10+A] | . [13+14+15+16] Count | HIt |
| [2+3+7+8+9+10+A] | . [12] Count | Hit |
| [4+5+6] | . [12] Count | Stand |
| [2+3+4+5+6+7+8+9] | . [10] Count | Double Dn |
| [10+A] | . [10] Count | Hit |
| [2+3+4+5+6] | . [9] Count | Double Dn |
| [7+8+9+10+A] | . [9] Count | Hit |

Figure 2:
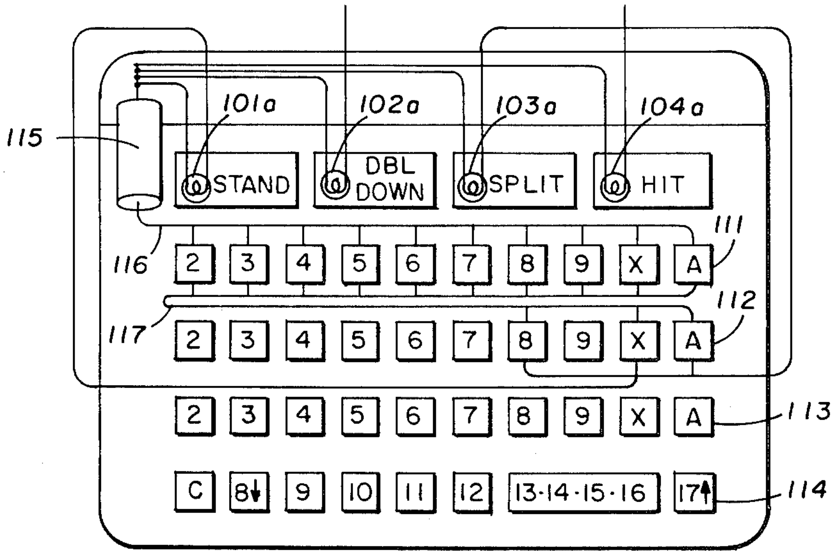
FIG. 2 illustrates a circuit connection utilizing the system of FIG. 1 to illustrate signaling either a STAND decision or a SPLIT decision.

The manner in which switches are intereconnected is illustrated in FIG. 2 for a specific case. In FIG. 2 it will be noted that lamps **101*a*–104*a* each have one terminal connected to one terminal of a battery 115. The other terminal of battery 115 is connected by conductor 116 to one terminal of each of the switches in set 111. An output circuit 117 is connected to inputs to switches for keys 8, X and A in set 112.**

The connections indicated in FIG. 2 represent generation and display of a decision under the conditions of the first two lines of Table I. More particularly, the circuit is arranged such that regardless of the dealer's up card, if the player has a pair of tens, then he stands. If the player has a pair of eights or a pair of aces, then he splits and plays the two cards as separate hands.

The logic circuitry in connection with the switches involved causes either the lamp **101*a* or the lamp 103*a* to be energized. Lamp 101*a* will always be energized if the player has a pair of tens. Lamp 103*a* will always be energized if the player has a pair of aces or a pair of eights. It will be understood that FIG. 2** illustrates only the circuit paths for the first two lines of Table I.

FIG. 3 illustrates further details as to the embodiment of the device for the circuits indicated in FIG. 2. In this system, a solid state switching unit **111*a* is provided with a push button which closes the circuit through unit 111*a*. The output from the unit 111*a* is connected through a bank 121 of diodes which lead to an output bus 122. Bus 122 is connected through a bank of diodes 123 to inputs to each of switch units 112*a*–112*j*. The output terminal of switches 112*g* and 112 *j* are connected by way of diodes through a common output bus 124. Bus 124 then leads to lamp 103*a*. Thus, if any of the push buttons in connection with the set 111 are actuated to signify the dealer's up card and either unit 112*g* or 112*j* are actuated, then the lamp 103*a* will be illuminated signaling the decision is to split the pair. If unit 112*i* is The diodes 121 and 123** serve to isolate outputs and inputs of the various switching elements.

FIG. 4 illustrates circuitry corresponding to that of FIG. 3 wherein flip-flop units serve as the switch elements. More particularly, a conventional flip-flop unit 130 may be actuated by push button switch 131 to signify that the dealer's up card is a 2. Similarly, flip-flop 132 can be actuated to change state to indicate that the dealer's up card is a 3 by depression of push button 133. The CLEAR switch is provided for applying a clear voltage state from terminal 135 to each of the CLEAR or reset terminals on the flip-flops of the circuit of FIG. 4.

It will be noted that the battery 115 is connected to apply a desired state to the D terminal of each of the flip-flops and the same state is then applied to the control terminal by closure of the push button switch associated with the unit.

For the specific condition wired in and shown in FIG. 4, the outputs of flip-flops 130, 132 and 134 are connected to the input of flip-flop 136. This indicates implementation of the third condition in Table I wherein if the dealer's up card is any one of a 2, 3 or 4 and the player's hand comprises a pair of 3's, then the player should split, the latter being signaled by energization of the lamp **103*a*.**

Referring now to FIG. 5, a modified form of play director 200 has been illustrated. It is shaped and implemented more in the familiar style of hand held calculators. It has four normally deenergized indicators 201–204. It has a 20 key keyboard. In addition to the keys for A, 2, 3, 4, 5, 6, 7, 8, 9 and X, a key **214*b* is provided for entry of the player's hand on hard count having value of eight or less. Keys 214*c*, 214*d*, 214*e*, 214*f*, 214*g*, and 214*h* are provided for entry of other hard count totals as in the system of FIG. 1.** A CLEAR key 214*a* is also provided. In addition, keys 230 and 231 are provided for signifying two qualities of hands other than hard count hands. Key 230 signifies that the player's hand contains a pair. Key 231 signifies a player's hand is a soft count hand. The odds criteria set forth in Table I may then be incorporated in memory in the play director 200. In sequence, the first key entered through the use of keys A, 2, 3, 4, 5, 6, 7, 8, 9, X would signify the dealer's up card. The next entry would then be made following actuation of key 230 or key 231 or one of the keys 214*b*–214*h*. The circuit would then be completed in accordance with Table I to energize the given signaling unit 201–204.

FIG. 6 illustrates a modified form of display. Rather than use lamps as shown in FIGS. 1–4, an array of light emitting diodes may be provided in a miniature display unit 300. Diodes 301–304 may be provided for an indication to the player of the decision he is to follow. The diodes would be energized in accordance with known techniques to display the STAND, DOUBLE DOWN, SPLIT or HIT decision. Preferably, such a display would be mounted on a pair of spectacles or eyeglasses with the face thereof reflected, through a suitable lens, to the eye of the wearer, all in the manner illustrated and described in Bell Helicopter News, Vol. 22, No. 13, Apr. 5, 1974. With such a display, the hand held unit such as shown in FIG. 1 or FIG. 5 is operated without observation by others and with the decision made immediately available to the vision of the wearer so that the game is played with the assistance provided by the play director unnoticed and totally unobtrusive. Alternatively, small lamps could be mounted directly on the lens of an eyeglass and selectively energized generally in the manner taught in U.S. Pat. No. 3,463,885 to Hubert W. Upton.

In a further modification, the decision of the play director may be audible. An earphone leading from the director may be energized by one, two, three or four notes, for example, to signify the play decision STAND, DOUBLE DOWN, SPLIT or HIT, respectively. Alternatively, hand held calculators are currently available in which audible word patterns are generated to signify calculator results. Thus the words STAND, DOUBLE DOWN, SPLIT or HIT may be generated audibly for reception by the player using a play director coupled to an earphone, or by touch through electromechanical transducers coupled to the body of the player.

Having described the invention in connection with certain specific embodiments thereof, it is to be understood that further modifications may now suggest themselves to those skilled in the art and it is intended to cover such modifications as fall within the scope of the appended claims.

What is claimed is:

1. A blackjack play director which comprises:

a. structure having four normally deenergized indicator means adapted to be sensed by a player, each said indicator means providing a corresponding one of four blackjack play responses when energized, b. a plurality of input switches, and c. circuit means interconnecting said switches and said indicator means for exclusive actuation of any one of said four indicator means i. said circuit means including means responsive to closure of a first of said switches representative of the value of a dealer's up card, and ii. means further responsive to closure of one or more additional ones of said switches to represent the status of the player's first two cards, said circuit means being constructed and arranged in dependence upon a predetermined odds criteria to signal to said player a proper response by actuation of one of said indicator means.

2. A blackjack play director which comprises:

a. an indicator unit having means normally deenergized to selectively signal exclusively one of four indications positioned to be sensed by a player and an input key means actuable by said player including i. means to signal a representation of each of the cards having numerical count A-10 to enter the value of any dealer up card, ii. means to signal a representation of each of the cards having numerical count A- 10 to enter the existence and value of a pair in the player's hand, iii. means to signal a representation of each of the cards having numerical count A- 10 to signal the presence of an ace and to enter the value of a card in a player's hand which accompanies said ace card, and iv. means to signal representations of a. a player hand total count of 8 or less, b. a player hand of total counts of 9, 10, 11 or 12, c. a player hand of total count of 13, 14, 15 or 16, and d. a player hand of total count of 17 or higher, and b. circuit means interconnecting said keys and said display and responsive to said representations and the order of occurrence thereof to provide a circuit exclusively to one of said indicators in accordance with a predetermined odds criteria to signal to said player a proper response.

3. A blackjack play director which comprises:

a display unit having four normally deenergized indicators positioned to be simultaneously viewed by a player and four sets of input keys and associated switches wherein:

i. a first set includes a plurality of keys, one to represent each of the cards having numerical count A-10 to enter the value of a dealer up card, ii. a second set includes a plurality of keys, one to represent each of the cards having numerical count A-10 to enter the existence of a pair in the player's hand, iii. a third set includes a plurality of keys, one to represent each of the cards having numerical count A-10 to enter the value of a card in a player's hand which accompanies an ace card, and iv. a fourth set includes:

a. one key to represent a player hand total count of 8 or less, b. keys to represent each of total counts of 9, 10, 11 and 12, c. one key to represent a total count of 13, 14, 15 or 16, and d. a key to represent a total count of 17 or higher, and circuit means interconnecting said switches to provide a circuit exclusively to one of said indicators through said first set at a location representing the value of said up card and through one of said second, third or fourth sets representing said player's hand in accordance with a predetermined odds criteria to signal to said player a proper response.

4. The combination set forth in claim 1 in which said play director is a hand held unit having a plurality of normally deenergized indicator lamps therein.

5. The combination set forth in claim 4 in which said input switches are arrayed in four different banks with the first bank being interconnectible through any one of the three banks to said indicator for selective energization of one of said indicators to signal said proper response.

6. The combination set forth in claim 5 in which AND logic circuitry interconnects said first bank and said other three banks of switches.

7. The combination set forth in claim 1 in which said indicator means is optically sensible.

8. The combination set forth in claim 1 in which said indicator means is audibly sensible.

9. The combination set forth in claim 1 in which said indicator means is touch sensible.

* * * * *